R. L. FORD.
SEED PLANTER.
APPLICATION FILED JUNE 1, 1915.
1,323,625.
Patented Dec. 2, 1919.
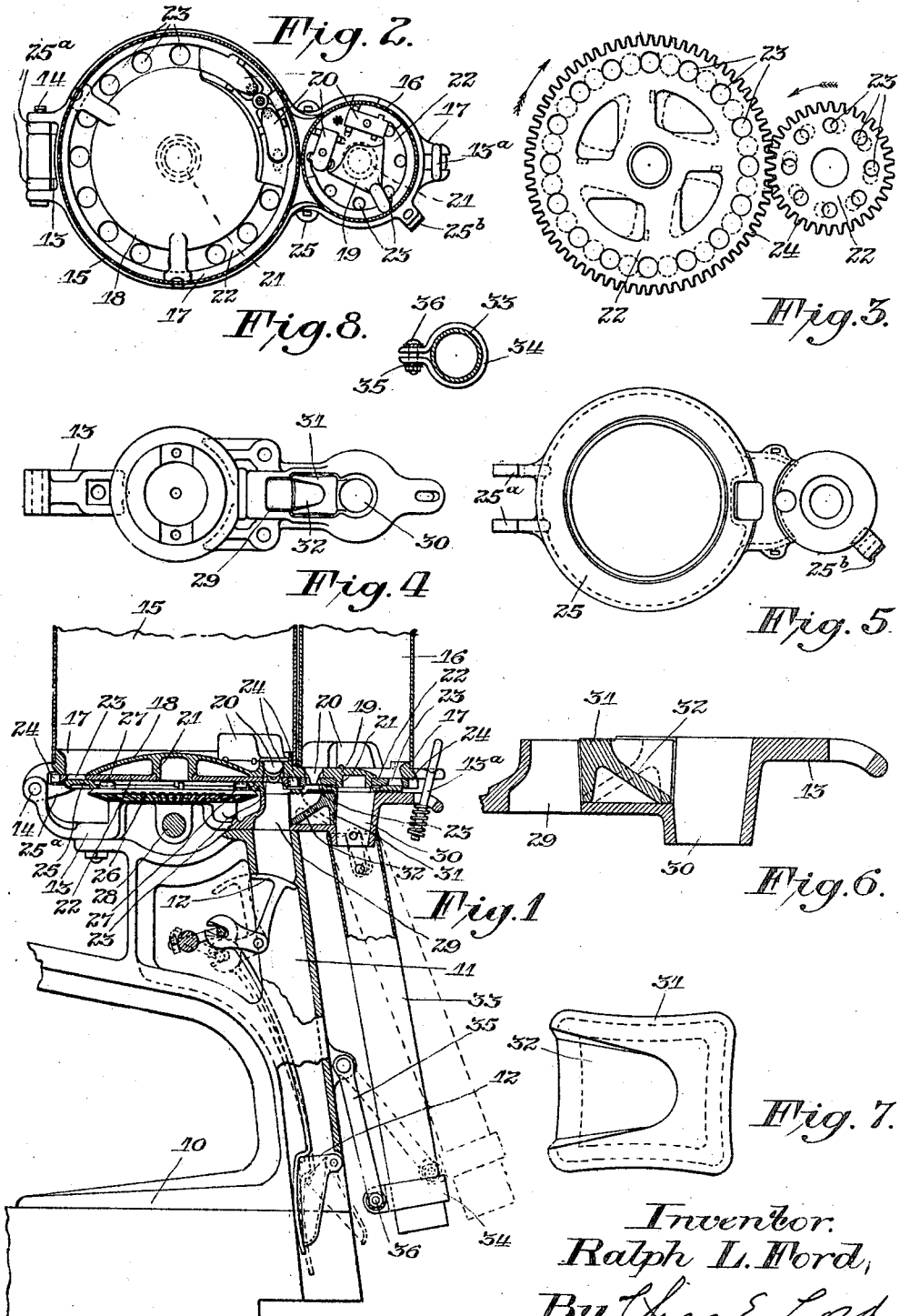
Inventor:
Ralph L. Ford,
By Chas. E. Lord
Atty.

UNITED STATES PATENT OFFICE.

RALPH L. FORD, OF CHICAGO, ILLINOIS, ASSIGNOR, BY MESNE ASSIGNMENTS, TO INTERNATIONAL HARVESTER COMPANY, A CORPORATION OF NEW JERSEY.

SEED-PLANTER.

1,323,625.  Specification of Letters Patent.  Patented Dec. 2, 1919.

Application filed June 1, 1915. Serial No. 31,544.

*To all whom it may concern:*

Be it known that I, RALPH L. FORD, a citizen of the United States, residing at Chicago, in the county of Cook and State of Illinois, have invented certain new and useful Improvements in Seed-Planters, of which the following is a full, clear, and exact specification.

This invention relates to seed planters, and has for its object to plant different characters of seeds; as, for instance, corn and beans or peas, in an improved manner, and also to simplify and improve the construction and operation of devices adapted for this kind of planting.

In carrying out my invention I have employed a double hopper arrangement hinged to the furrow opening frame of a planter, separate seed dropping devices for each of the hoppers, improved driving connections for the seed plates of the dropping devices, means whereby the different varieties of seeds may be dropped through the same or different conduits to the ground, and means for varying the depth at which the seeds contained in one of the hoppers may be planted.

One form of my invention is exemplified in the following description and illustrated in the accompanying drawings, in which—

Figure 1 shows a vertical central sectional view of a corn planter runner fitted with seed dropping devices constructed in accordance with my invention;

Fig. 2 shows a view in plan of the double hoppers employed in my invention;

Fig. 3 shows a plan view of the two seed plates employed;

Fig. 4 shows a plan view of the base plate upon which the hoppers and seed dropping devices are carried;

Fig. 5 shows a plan view of the hinged locking plate carried on the bottom of the hoppers;

Fig. 6 shows an enlarged sectional view of a portion of the base plate illustrating the arrangement of the diverting block employed therein for directing the seeds to either conduit;

Fig. 7 shows a plan view of the diverting block removed; and

Fig. 8 shows a plan view of the bottom of the swinging conduit or discharge spout employed in my device and illustrating the slidable gripping member used thereon for adjusting the position of the spout.

Referring in detail to the particular form illustrated herewith, there will be seen a furrow opening runner 10 of ordinary construction fitted with the usual discharge conduit 11, and in which are arranged controlling valves 12 which may be operated in any desired manner for hill planting or held in inoperative position for drill planting. Upon the runner 10 is arranged a base plate 13, to which is hinged at 14 a main hopper 15 designed to contain corn, and an auxiliary hopper 16 to receive peas, beans or the like, the two being carried side by side upon an integrally united double annular frame member 17. The frame member 17 carries within the portion underlying the main hopper a cover plate 18, and under the auxiliary hopper a similar plate 19, each of said plates having fitted between it and the adjacent wall member of the annular frame an ejector and knock-out mechanism 20. Below each cover plate, upon a boss 21, is carried a rotatable seed plate 22, each of the seed plates being provided with circumferentially arranged seed cells 23, and having formed on their peripheries intermeshing gear teeth 24. Below the seed plates, and supporting the same in position against the cover plates, is a locking plate 25 of the form shown in Fig. 5, having lugs 25$^a$ hinged to the base plate coaxially with the hoppers, and a spring catch 25$^b$ to engage the frame of the hoppers and thereby removably hold the seed plates in position when the hoppers are raised. Beneath the main hopper 15, and rotatable upon the base plate 13, is a bevel gear 26, having driving lug connections 27 with the adjacent seed plate. The gear 26 may be driven in any preferable manner from an actuating shaft 28.

From the structure thus far described it will be understood that the gear 26 drives the seed plate contained in the main hopper, and that the seed plate in the auxiliary hopper is driven from the former by reason of the intermeshing gear teeth 24. The seed plates thus rotate in opposite directions. A spring-pressed locking link 13$^a$ releasably holds the hoppers in position on the base 13, and, on account of the method of driving the seed plates, the hinged parts may be swung to and from operative position without attention to the driving connections.

In the base plate 13 is provided a discharge opening 29 registering with the conduit 11 below and communicating above with the ejector mechanism in the seed hopper. A similar opening 30 is provided below the auxiliary hopper in position spaced rearwardly of the opening 29. Between the two discharge openings there is fitted a reversible diverting block 31 having a beveled portion 32 and, as shown in Fig. 4, the block may be so positioned that its beveled surface causes the seed discharged by the auxiliary hopper to enter the discharge conduit 11; or, if desired, the position of this block may be reversed as shown in Fig. 6, so that the seed discharged by said hopper will be directed into the opening 30. Below the opening 30, and communicating therewith, is a discharge spout 33 hinged to the base plate at its upper end and provided at its lower end with a gripping band 34 slidable up and down thereon, to which is connected a pivoted link 35 carried upon the rear end of the runner. A bolt 36, provided with a suitable tap, forms the connection between the link and gripping band, by means of which the outstanding ears of the band may be drawn together to lock the spout in the desired relation to the runner.

From the description thus far given, it will be understood that seeds from both hoppers may be planted in the same hill when the diverting block is so adjusted, and that, should it be desired to plant different characters of seeds separately, this may readily be done by changing the position of the block 31, whereupon the seed from the auxiliary hopper will be directed to the ground through the discharge spout 33. By reason of the hinged adjustable mounting of this discharge spout the operator will be enabled to vary the distance by which the different seeds are separated. Thus the peas or beans can be dropped relatively close to the corn, or farther apart, as desired. By reason of this separate discharge spout the operator is also enabled to drop corn in hills while at the same time dropping the seed contained in the auxiliary hopper in drilled formation. It is also to be noted that by reason of the hinged adjustable spout the speed of the planting mechanism, when drilling, can be varied to increase or diminish the distance between each kernel of corn, and that a proper adjustment can thereupon be made to cause the seed being planted by the auxiliary hopper to fall one grain at a time substantially midway between the kernels of corn.

A novel and important feature of my invention resides in the means whereby the depth of planting of the seed from the auxiliary hopper may be varied. Peas or beans, it will be understood, should not ordinarily be planted at as great a depth as corn, better results being secured where the former are planted quite shallow. The objection to prior structures embodying pea attachments has been that the peas or beans are planted at the same depth as the corn. Usually these seeds are discharged through the same conduit that receives the corn. However, in my invention, by providing a separate discharge spout on the auxiliary hopper and making this discharge spout adjustable at its lower end, the point at which the seeds from the auxiliary hopper are deposited upon the ground may be varied in a direction to and from the heel of the runner. Therefore, if it should be desired to plant peas or beans at a relatively great depth, the spout 33 should be moved forwardly so that the seeds will fall to the furrow made by the runner before the earth has had time to materially fill the furrow. To obtain a shallower planting the spout should be swung rearwardly to a position where the seeds will be dropped in the furrow a greater distance behind the runner, at which point the furrow made by the runner will be comparatively well filled by the action of the dirt rolling in. The point at which the peas or beans should be dropped may be accurately gaged by adjusting the gripping band 34 up and down on the discharge spout.

It should also be noted in connection with my invention that the cells 23 of the seed plates may be so positioned that they stand in radial alinement, at which time the seeds dropped from both hoppers will fall simultaneously. However, by changing the mesh of the gear teeth 24, merely by rotating one of the gears independently a sufficient distance to advance it one tooth, the cells will be relatively offset, as shown by dotted lines in Fig. 3, at which time they will drop their seeds alternately. This adjustment of the seed plates may, obviously, be employed at any time, either when the auxiliary hopper is in communication with the conduit 11, or with the spout 33. Such an adjustment offers a greater variety of spacings.

While I have shown and described but one form of my invention herein, it is to be understood that it is susceptible of modifications, and, therefore, that many changes may be resorted to in the construction and arrangement of the several parts without departing from the scope thereof as disclosed in the appended claims.

What I claim as new is:

1. In a seed planter, a frame, a base plate carried thereby and having separate discharge openings, a pair of hoppers arranged above said plate, seed dropping devices for each of said hoppers, the discharge openings of said plate registering with said seed dropping devices and a reversible deflecting member carried by said plate and located in one of said discharge openings and operative to direct the seed toward or from the remaining discharge opening.

2. In a seed planter, a main hopper, an auxiliary hopper, seed dropping devices for each of said hoppers, separate discharge openings adapted to register with said dropping devices, a seed conduit for each of said discharge openings, and a reversible seed deflecting block carried in one of said discharge openings for directing the seed from said auxiliary hopper into either of said seed conduits.

3. In a seed planter, a main hopper, an auxiliary hopper, seed dropping devices including a rotary seed plate for each of said hoppers, a separate discharge conduit for each of the dropping devices, and adjustable means located at the inlet ends of said conduits to direct the seed contained in said hoppers through one or both of the discharge conduits.

4. In a seed planter, a hinged frame member, a pair of adjacent annular openings therein, a pair of hoppers carried by said frame member, one hopper being located above each opening, an easily detachable rotatable seed plate positioned below each opening in said frame member, said plates having seed cells therein, a gear ring carried by each of said plates, said rings having their teeth intermeshing, the number of gear teeth on the said plates being proportional to the number of seed cells in said plates, said teeth being so arranged relative to the cells in the plates to bring the latter in radial alinement when in one position of adjustment and in offset relation when in another position of adjustment, whereby the seeds from the respective hoppers in said plates may be dropped simultaneously or alternately.

5. In a seed planter, a base plate, ring-shaped frame members integrally united and hinged to said base plate, and a pair of hoppers carried on said frame members.

6. In a seed planter, a base plate, a plurality of separate hoppers unitarily hinged thereon, a rotatable seed plate in each of the hoppers, and a hinged locking plate beneath said seed plates and detachably connected to the hoppers.

7. In a seed planter, a base plate, a plurality of separate hoppers unitarily hinged thereon, a rotatable seed plate in each of said hoppers, said seed plates being provided with gear teeth on their peripheries and arranged to intermesh, a horizontal driving gear supported on the base plate and having detachable driving connections with one of said seed plates, and means for actuating said driving gear.

In testimony whereof I affix my signature, in the presence of two witnesses.

RALPH L. FORD.

Witnesses:
EVAN EVANS,
HERBERT DEKKER.